July 9, 1957

C. EWALT 2,798,420

ADJUSTABLE GROUND ENGAGING TOOL

Filed April 8, 1955

INVENTOR.
CLAUDE EWALT
BY
McMorrow, Berman & Davidson
ATTORNEYS

United States Patent Office 2,798,420
Patented July 9, 1957

2,798,420

ADJUSTABLE GROUND ENGAGING TOOL

Claude Ewalt, Great Bend, Kans.

Application April 8, 1955, Serial No. 500,135

3 Claims. (Cl. 97—54)

This invention relates to farm implements, and more particularly to an adjustable farm implement which may be attached to the tool bar of a tractor and which may be adjusted to perform a wide range of functions.

A main object of the invention is to provide a novel and improved tool bar attachment for a tractor which enables a farm implement, such as a cultivator unit to be attached to the tool bar of a tractor and to be adjusted in orientation so that it is arranged to perform various different functions, the improved attachment involving simple components, being easy to install, and being arranged so that the adjustments thereof can be made rapidly and without tools.

A further object of the invention is to provide an improved tool bar attachment for a tractor which enables a cultivator unit or similar implement to be adjusted angularly both horizontally and vertically to provide a desired function, the improved attachment being inexpensive to fabricate, being rugged in construction, being highly versatile in performance, and being adjustable so that a reverse action of the tool elements thereof may be obtained, if so desired.

Further objects and advantages of the invention will become apparent from the following description and claims, and from the accompanying drawings, wherein:

Figures 1, 2:
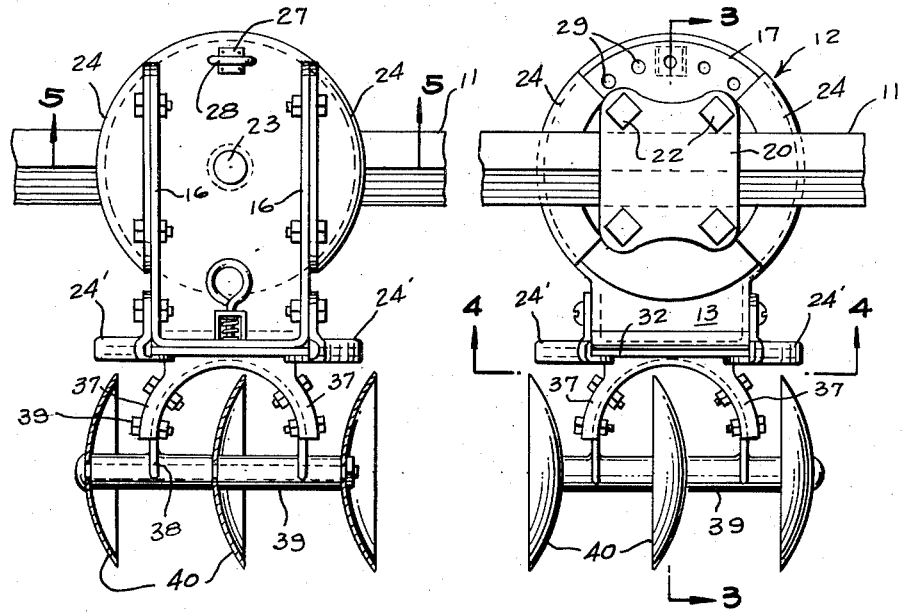
Figure 1 is a front elevational view of a tool bar attachment according to the present invention, shown mounted on a transverse tool bar of a conventional tractor.
Figure 2 is a rear elevational view, partly in vertical cross section, of the tool bar attachment of Figure 1.

Referring to the drawings, 11 designates the conventional transverse horizontal tool bar of a farm tractor of known construction, said tool bar being, for example, square in cross sectional shape, as illustrated. Designated generally at 12 is an improved tool bar attachment arranged to be secured on the tool bar 11. The tool bar attachment 12 comprises a generally L-shaped frame member 13 having the vertical, transversely extending arm 14 and having the horizontal arm 15, the frame member 13 being provided with the side flanges 16, 16 extending perpendicular to the respective arms 14 and 15 of the frame member.

Figures 3, 4:
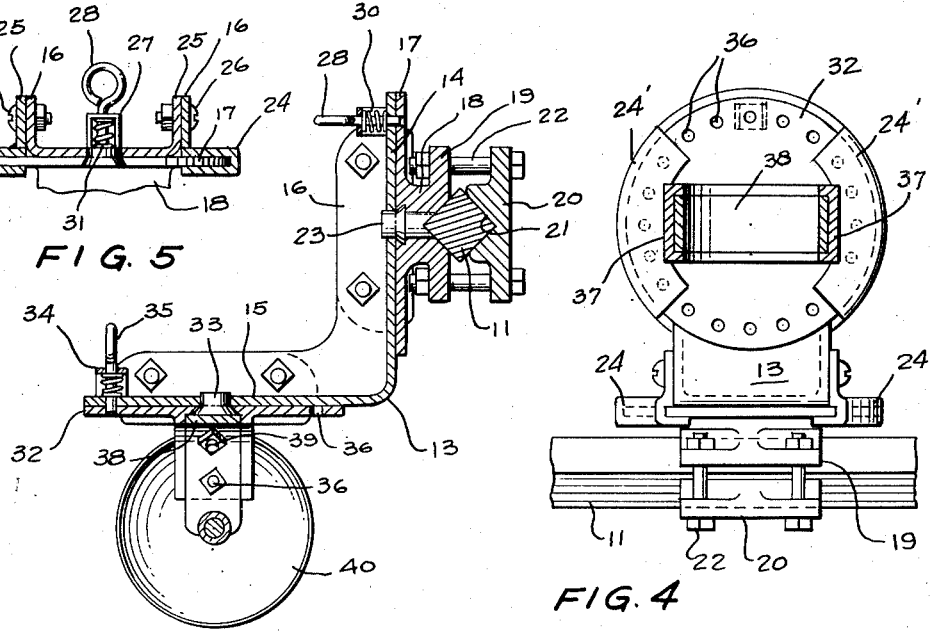
Figure 3 is a vertical cross sectional view taken on the line 3—3 of Figure 1.
Figure 4 is a horizontal cross sectional view taken on the line 4—4 of Figure 1.

Designated at 17 is a vertical disc member centrally formed with a hub portion 18 which terminates in a generally square flange portion 19 extending parallel to the main body of the disc member 17, as is clearly shown in Figure 3. The hub 18 and flange 19 are transversely grooved to receive a corner portion of the transverse tool bar 11, as shown in Figure 3, the hub portion 18 being clamped to the tool bar by the provision of a cooperating, generally square clamping plate 20 which is grooved at 21 to receive the corner portion of the tool bar 11 opposite to the hub portion 18. The flange 19 is clamped to the plate 20 by respective bolts 22 extending through the corner portions of the flange 19 and plate 20, as is clearly shown in Figures 1 and 3.

Rigidly secured in the central portion of the hub 18 and thus located centrally on the main body of the disc 17 is the horizontally extending pivot stud 23 which projects through the intermediate portion of the vertical arm 14 of frame member 13.

Figure 5:
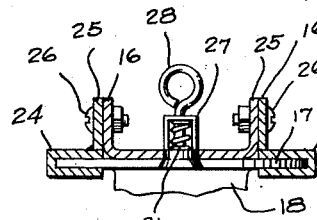
Figure 5 is a cross sectional detail view taken on the line 5—5 of Figure 2.

Secured to the upper portions of the flanges 16 at the outer sides of said flanges are the oppositely arranged arcuate retaining channels 24, 24 which receive opposite peripheral portions of the disc member 17 and thus support said frame member 13 for rotation around the horizontal pivot stud 23. As shown in Figure 5, the channel members 24 are formed with respective flange elements 25 which are secured in face-to-face engagement with the upper portions of the flanges 16, 16 by suitable bolts 26, thus defining a guideway for the periphery of the disc member 17 and allowing said frame member 13 to be rotated through a full revolution, if so desired, around the pivot pin 23.

Mounted on the upper portion of the arm 14 is a bracket member 27 of inverted U-shape which supports a locking pin 28, said locking pin having a shank portion extending through the bracket member and being engageable through an aperture provided in the upper portion of the arm 14 to enter a selected aperture 29 provided in the frame member 13, whereby the disc member may be locked in a selected adjusted rotated position thereof. A coiled spring 30 surrounds the shank of the locking pin 28 inside the bracket 27, bearing between the bracket 27 and a collar element 31 secured on the locking pin 28, biasing the locking pin inwardly so that it is normally retained in the selected aperture 29 of the frame member 13. When it is desired to rotate the arm 14 to a different adjusted position, the pin 28 is pulled outwardly, freeing the frame member 13 for rotation around the pin 23, so that the arm 14 may be moved to a different angular position with respect to the pivot pin 23 and may be locked in said different position by releasing the pin 28.

As shown in Figure 1, the locking apertures 29 are provided around a substantial marginal portion of the disc member 17 so that the frame member 13 may be secured in a desired rotated position around the axis of the pivot pin 23.

Secured to the lower portions of the flanges 16, 16 adjacent the horizontal arm portion 15 are respective oppositely arranged arcuate channel members 24', 24' which face inwardly towards each other and which receive the opposite marginal portions of a horizontal disc member 32.

Centrally secured to the horizontal disc member 32 is the upstanding pivot stud 33 which projects through a pivot opening provided in the horizontal arm 15, whereby the disc member 32 may be rotated around the axis of the pivot stud 33 substantially in face-to-face engagement with the arm 15.

Mounted on the rear portion of the arm 15 is a bracket member 34 of inverted U-shape in which is provided a locking pin 35 which projects through an aperture in the arm 15 and which is registrable with a selected aperture 36 provided in the disc member 32. As shown in Figure 4, the apertures 36 are provided in the marginal portion of the disc member 32 and are spaced around the entire margin of said disc member, the apertures being evenly spaced and being arranged at a common distance from the pivot stud 33, whereby the disc member 32 may be locked in any adjusted rotated position around the pivot stud 33.

As shown in Figure 2, the disc member 32 is formed with depending arm portions 37, 37 which are channeled to receive the generally U-shaped yoke member 38. The yoke member 38 is secured in the arms 37, 37 by suitable fastening bolts 39, as shown in Figures 2 and 3. Rigidly secured to the ends of the arms of the yoke member 38 is the transversely extending tool-carrying member 39 on which are mounted the spaced cultivator discs 40, 40.

As will be readily apparent, the orientation of the discs 40 may be adjusted around the axis of the pivot stud 33 by rotating the disc member 32 relative to the arm 15. This may be accomplished by lifting the locking pin 35 to free the disc member 32, whereby the disc member 32 may be rotated to a desired adjusted position and may be locked in said position by releasing the pin 35 to allow the pin to enter a selected aperture 36 of disc member 32. Similarly, as above explained, the orientation of the frame member 13 may be adjusted around the axis of the pivot stud 23 by rotating the upper arm 14 around the pivot stud 23.

Thus, universal adjustment of the orientations of the tool elements 40 may be obtained, both around the axis of the disc member 17 and the axis of the disc member 32. This enables the tool elements 40 to be adjusted to any desired position in relation to the ground, and furthermore permits the disc members to be adjusted in reverse positions so that reverse action of the cultivator discs 40 may be obtained, if so desired. It will be further noted that all adjustments can be made quickly without requiring the use of a wrench or any other tool. It will be further apparent that the tool elements 40 may be locked in positions completely out of engagement with the ground, facilitating the transportation of the attachment, when desired.

While a specific embodiment of an improved tool bar attachment for a tractor has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A tool bar attachment for a tractor comprising an L-shaped frame having an upstanding arm and a horizontal arm, a clamp member arranged to be secured to the tool bar of a tractor, a transverse vertical disc secured to said clamp member, a central horizontal pivot stud on the disc extending rotatably through the intermediate portion of said upstanding arm, opposed arcuate channels secured to said upstanding arm and slidably receiving opposite peripheral portions of said disc and pivotally connecting said upstanding arm to said clamp member for rotation around a horizontal axis parallel to said horizontal arm, means releasably locking said upstanding arm to said clamp member in rotative adjusted position around said axis, a ground-engaging tool element, means pivotally connecting said tool element to said horizontal arm for rotation around an axis parallel to said upstanding arm, and means releasably locking said tool element to said horizontal arm in rotated adjusted position around said second-named axis.

2. A tool bar attachment for a tractor comprising an L-shaped frame having an upstanding arm and a horizontal arm, a clamp member arranged to be secured to the tool bar of a tractor, a transverse vertical disc secured to said clamp member, a pivot pin secured centrally in said disc to said clamp member and extending through said upstanding arm parallel to said horizontal arm, opposed arcuate channels on said upstanding arm slidably receiving opposite peripheral portions of said disc, whereby said upstanding arm is connected to said clamp member for rotation around said pivot pin, means releasably locking said upstanding arm to said clamp member in rotated adjusted position around said pivot pin, a ground-engaging tool element, a pivot pin secured to said tool element and extending through said horizontal arm parallel to said upstanding arm, means whereby said tool element is connected to said horizontal arm for rotation around said second-named pivot pin, and means releasably locking said tool element to said horizontal arm in rotated adjusted position around said second-named pivot pin.

3. A tool bar attachment for a tractor comprising a vertical disc member, means arranged to clampingly secure said disc member to the transverse tool bar of a tractor in a vertical position parallel to said transverse tool bar, an L-shaped frame having an upstanding arm and a horizontal arm, opposed arcuate channels on said upstanding arm slidably receiving opposite peripheral portions of said disc member, a stud member centrally secured to said disc member and extending rotatably through said upstanding arm, whereby said upstanding arm is pivotally connected in face-to-face engagement with said vertical disc member for rotation around the axis of said disc member, means releasably locking said upstanding arm to said disc member, a second disc member, a ground-engaging tool element secured to said second disc member, opposing arcuate channels on said horizontal arm slidably receiving opposite peripheral portions of said second disc member and pivotally connecting said second disc member in face-to-face engagement with said horizontal arm for rotation around an axis parallel to the first-named disc member, and means releasably locking said second-named disc member to said horizontal arm .

References Cited in the file of this patent
UNITED STATES PATENTS

| | | |
|---|---|---|
| 301,597 | Horst | July 8, 1884 |
| 648,361 | Sheahan | Apr. 24, 1900 |
| 2,693,748 | Kiser | Nov. 9, 1954 |